United States Patent
Aoyagi et al.

(10) Patent No.: US 7,443,837 B2
(45) Date of Patent: Oct. 28, 2008

(54) TELEPHONE COMMUNICATION SYSTEM

(75) Inventors: Hiromi Aoyagi, Kanagawa (JP); Shinji Usuba, Tokyo (JP); Hiroshi Kuboki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 44 days.

(21) Appl. No.: 10/547,177

(22) PCT Filed: Feb. 25, 2004

(86) PCT No.: PCT/JP2004/002185

§ 371 (c)(1),
(2), (4) Date: May 5, 2006

(87) PCT Pub. No.: WO2004/077807

PCT Pub. Date: Sep. 10, 2004

(65) Prior Publication Data

US 2006/0227951 A1 Oct. 12, 2006

(30) Foreign Application Priority Data

Feb. 28, 2003 (JP) ............................ 2003-054075

(51) Int. Cl.
*H04L 12/66* (2006.01)
(52) U.S. Cl. .................. 370/352; 370/395.52; 370/401
(58) Field of Classification Search ......... 370/352–356, 370/395.52, 401
See application file for complete search history.

(56) References Cited

U.S. PATENT DOCUMENTS 6,570,868 B1 5/2003 Cable et al.
2004/0254786 A1* 12/2004 Kirla et al. .................. 704/216

FOREIGN PATENT DOCUMENTS

| JP | 05-068050 | 3/1993 |
|---|---|---|
| JP | 08-130494 | 5/1996 |
| JP | 2001-513618 | 4/2001 |

* cited by examiner

*Primary Examiner*—Harry S Hong
(74) *Attorney, Agent, or Firm*—Venable LLP; Michael A. Sartori; Catherone M. Voorhees

(57) ABSTRACT

A telephone communication system in which a call-originating side and a call-incoming side communicate by telephone via a communication network capable of wideband communication and narrowband communication. When an apparatus exclusively used for narrowband communication, an apparatus capable of wideband communication and narrowband communication, and an apparatus exclusively used for wideband communication exist mixedly in between one end and another end, at least one of phone-call path parts between adjacent ones of the apparatuses is set to be different in transmission capability on a per phone-call path part basis, by sending and receiving information about transmission capabilities of the apparatuses in between the one end and the another end.

4 Claims, 12 Drawing Sheets

Fig.3
(A)
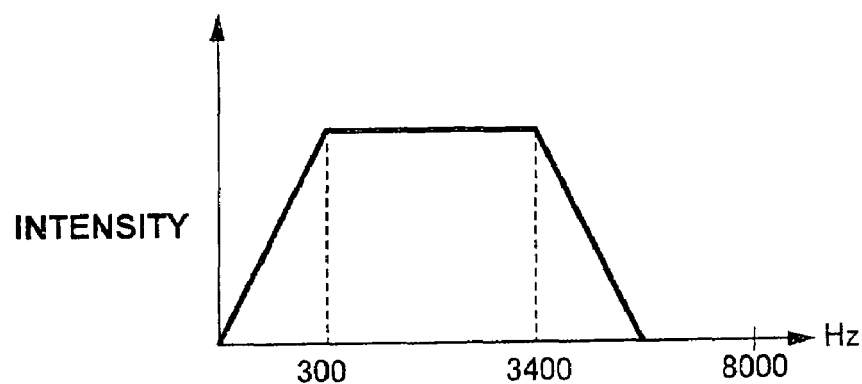
(B)
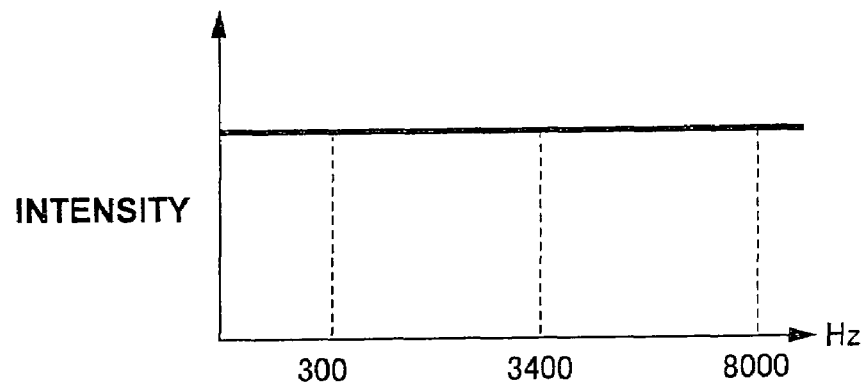
(C)
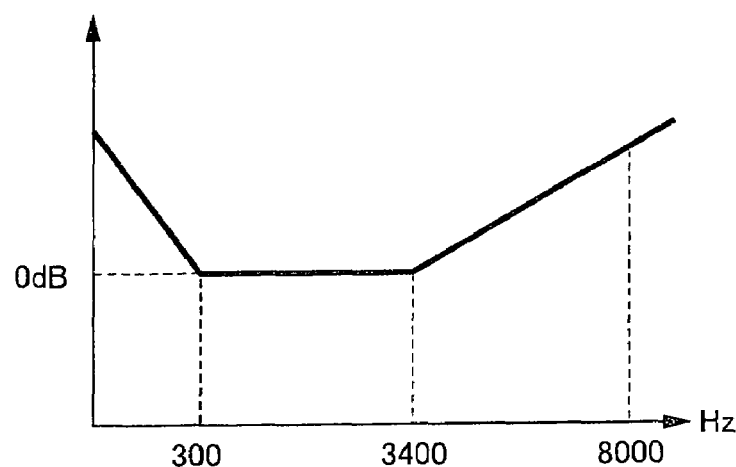

Fig.4
(A) 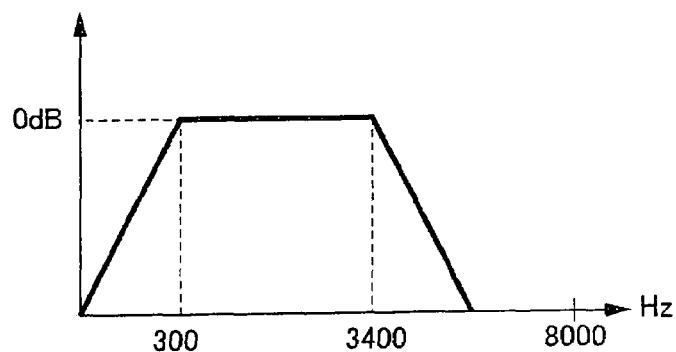
(B) 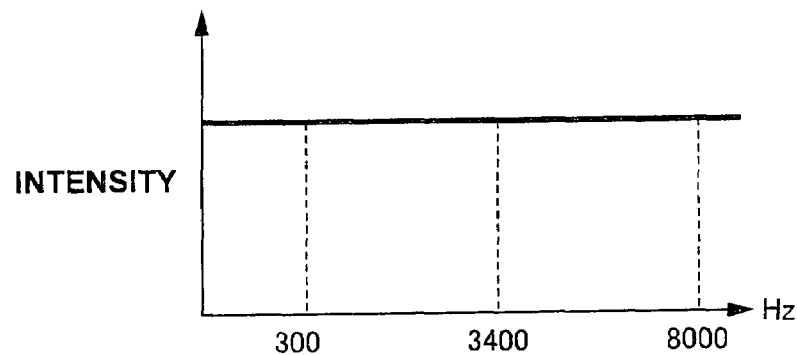
(C) 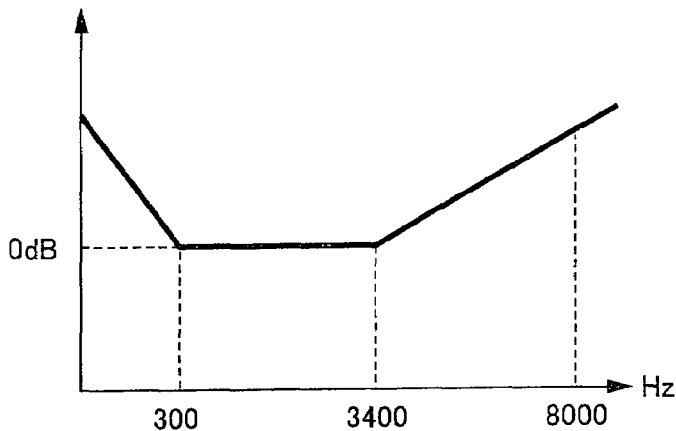
(D) 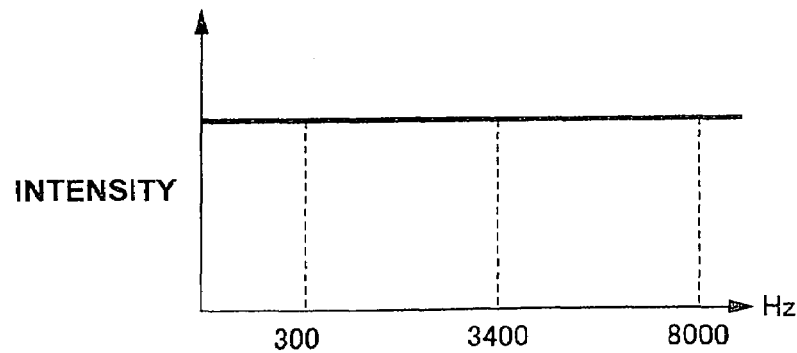

TELEPHONE COMMUNICATION SYSTEM

BACKGROUND OF THE INVENTION

1. Field of the Invention

The present invention relates to a telephone communication system, and can be applied to, for example, a telephone communication system including a telephone that can be connected to an IP network via a network connection apparatus.

2. Description of the Related Art

In recent years, a VoIP technology has integrated data and voice by translating the telephone signal into IP packets, thereby lowering network and communication costs, and thus has become widely used.

Moreover, the traditional public switched telephone network (PSTN) uses a band of 3.1 KHz or lower for communication, focusing on transmission of voice signals. That is, the terminal (narrowband telephone) side and the network side both treat signals in a band of higher than 3.1 KHz as unnecessary.

However, with the rapid progress of broadbandization in recent years, not only transmission equipment on the network side has become broadband-compliant, but also subscriber lines have been switched to broadband lines using ADSL, light or the like. Accordingly, end-to-end wideband voice communication has become possible, and thus wideband telephones are appearing.

Moreover, it is being researched and developed to enable narrowband telephones to perform quasi-wideband communication by adding a correction function between narrowband signals and wideband signals to gateway apparatuses.

Furthermore, because various telephones exist, the cases of using network connection apparatuses (gateway apparatuses) are increasing for wideband communication via a wideband network (wideband IP lines) and narrowband communication via a narrowband network (narrowband IP lines or the public switched telephone network). Also various gateway apparatuses are being proposed and developed corresponding to different networks where they are used.

As described above, there are various telephones, various gateway apparatuses, wideband networks, and narrowband networks, and thus there are many possible combinations of telephones, gateway apparatuses, and networks for a given telephone call.

However, in the case of a combination with which wideband communication is not possible over the entire end-to-end path, if communication is performed with narrowband signals over the entire end-to-end path, apparatuses with high transmission capability will be used wastefully.

Furthermore, VoIP-compliant gateway apparatuses and telephones, which have been widely used in recent years, with emphasis on being VoIP-compliant, have not realized high quality voice communication making use of the characteristics of broadbandized networks.

Yet further, it is unknown at the design stage of a telephone whether the telephone is connected to the public switched telephone network or an IP network and also it is unknown whether to be connected via a gateway apparatus to a network. Hence, even if the telephone is planned to have high quality and be wideband-compliant, it often occurs that sending and receiving signals is not appropriately performed when actually installed in a communication system and connected to, for example, a gateway apparatus.

Furthermore, it is being examined to correct the characteristics of a narrowband telephone by a gateway apparatus such that the narrowband telephone looks like a quasi-wideband telephone as described above, but it is not clear at what trigger they should be corrected, and hence there is a possibility that the correction will not bring out the highest performance.

SUMMARY OF THE INVENTION

In a case where apparatuses intended for wideband communication and apparatuses intended for narrowband communication exist mixedly in a communication path, a telephone communication system is desired which can bring out as much of the capability of each apparatus as possible.

According to the present invention, there is provided a telephone communication system in which an apparatus or apparatuses on a call-originating side, and an apparatus or apparatuses on a call-incoming side communicate by telephone via a communication network capable of wideband communication and narrowband communication, wherein at least one of the call-originating side and the call-incoming side is formed by apparatuses made up of one of a first type of wideband telephone capable of wideband communication and narrowband communication, a second type of wideband telephone exclusively used for wideband communication and a narrowband telephone exclusively used for narrowband communication; and one of a network connection apparatus capable of wideband communication and narrowband communication and a network connection apparatus exclusively used for narrowband communication, and wherein, when an apparatus exclusively used for narrowband communication, and one of an apparatus capable of wideband communication and narrowband communication and an apparatus exclusively used for wideband communication exist mixedly in between one end and another end, at least one of phone-call path parts between adjacent ones of the apparatuses is set to be different in transmission capability on a per phone-call path part basis, by sending and receiving information about transmission capabilities of the apparatuses in between the one end and the another end.

In the telephone communication system, in a case where the call-incoming side is formed by a network connection apparatus capable of wideband communication and narrowband communication;

a narrowband telephone and a wideband telephone of the first or the second type, that are accommodated in parallel by the network connection apparatus, when the narrowband telephone on the call-incoming side is off hooked in response after the capability of the wideband telephone of the first or the second type is notified to the call-originating side through an initial capability notice, the capability notice to the call-originating side is corrected, and, taking into account that a call-incoming telephone is the narrowband telephone, the transmission capabilities of phone-call path parts between adjacent ones of the apparatuses are set on a per phone-call path part basis.

Further, in the telephone communication system, the transmission capability of each phone-call path part is set to one of wideband communication, narrowband communication, and quasi-wideband communication implemented by a given apparatus performing an operation on a frequency characteristic of a phone-call signal. In this case, if the call-incoming side is formed by a network connection apparatus capable of wideband communication and narrowband communication;

a narrowband telephone and a wideband telephone of the first or the second type, that are accommodated in parallel by the network connection apparatus, when the narrowband telephone on the call-incoming side is off hooked in response after the capability of the wideband telephone of the first or the second type is notified to the call-originating side through an initial capability notice, the capability notice to the call-originating side is corrected, and, taking into account that a call-incoming telephone is the narrowband telephone, the transmission capabilities of phone-call path parts between adjacent ones of the apparatuses are set on a per phone-call path part basis.

The above and other objects and features of the present invention will become apparent from the following detailed description and the appended claims with reference to the accompanying drawings.

BRIEF DESCRIPTION OF THE DRAWINGS

FIG. 3 is a view for explaining a correction function for quasi-wideband according to the embodiment (part 1);

FIG. 4 is a view for explaining the correction function for quasi-wideband according to the embodiment (part 2);

DETAILED DESCRIPTION OF THE PREFERRED EMBODIMENT (A) First Embodiment

A first embodiment of a telephone communication system according to the present invention will be described below with reference to the accompanying drawings.

(A-1) Configuration of the First Embodiment

Figure 2:
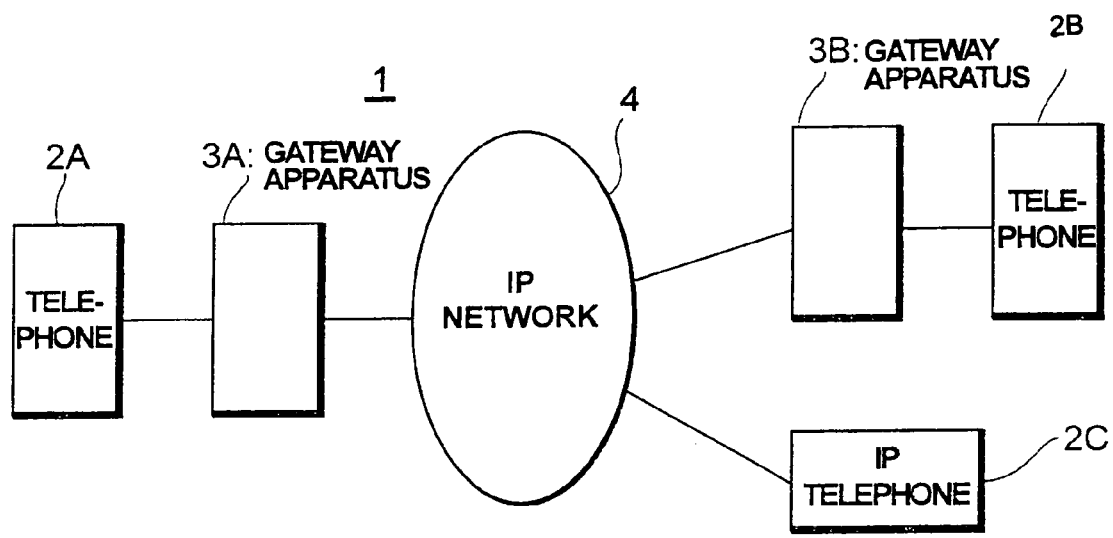
FIG. 2 is a block diagram showing the entire configuration of a telephone communication system of the embodiment.

FIG. 2 is a block diagram showing the entire configuration of the telephone communication system of the first embodiment.

In FIG. 2, a voice communication system 1 of the first embodiment is a system where gateway apparatuses 3A, 3B accommodating telephones 2A, 2B, and an IP telephone 2C are connected to an IP network 4. The telephones 2A and 2B can communicate by telephone via the IP network 4 and the telephone 2A and the IP telephone 2C also can communicate by telephone via the IP network 4.

Here, the telephones 2A, 2B may be individually a narrowband or wideband telephone. The narrowband telephone (called NB telephone as needed) is an analog terminal having a transmission capability of 300 Hz to 3.4 KHz. The wideband telephone (called WB telephone as needed) is an analog terminal having a transmission capability of 50 Hz to 7 KHz and higher. The wideband telephone can automatically switch to a narrowband mode when the gateway apparatus that accommodates the wideband telephone is a narrowband gateway apparatus.

Although wideband communication via the IP network 4 includes wideband communication of voice signals of, e.g., no higher than 8 KHz and wideband communication of audio signals of, e.g., no higher than 20 KHz, they are not distinguished herein.

Also the IP telephone 2C may be a narrowband or wideband telephone. The narrowband IP telephone (called NBIP telephone as needed) is an IP telephone having a transmission capability of 300 Hz to 3.4 KHz. The wideband IP telephone (called WBIP telephone as needed) is an IP telephone having a transmission capability of 50 Hz to 7 KHz and higher. The wideband IP telephone has a correction function associated with narrowband signals, and activates this correction function, for example, when a gateway apparatus opposite it is a narrowband gateway apparatus.

Furthermore, the gateway apparatuses 3A, 3B may be individually a narrowband or wideband gateway apparatus.

The narrowband gateway apparatus (called NBGW as needed) is a VoIP gateway apparatus capable of analog transmission of 300 Hz to 3.4 KHz.

The wideband gateway apparatus (called WBGW as needed) is a VoIP gateway apparatus capable of analog transmission of 50 Hz to 7 KHz and higher. The wideband gateway apparatus has a correction function associated with narrowband signals, and activates this correction function, for example, when a gateway apparatus opposite it is a narrowband gateway apparatus or a telephone that it accommodates is a narrowband telephone.

The IP network 4 functions as a wideband or narrowband IP line depending on the types of the telephone 2A, 2B, the IP telephone 2C, and the gateway apparatuses 3A, 3B engaged in telephone call.

Next, the correction function associated with narrowband signals of the wideband gateway apparatus and wideband IP telephone will be briefly explained. While the following will describe the correction of signals between a wideband gateway apparatus and a narrowband telephone accommodated by it, the correction between other apparatuses is almost the same in concept.

First, the case will be explained where a wideband gateway apparatus corrects a voice signal from a narrowband telephone.

The signal from the narrowband telephone is restricted in band considering the usual public switched telephone network and has the lower band of no higher than 300 Hz and the higher band of no lower than 3,400 Hz attenuated as shown in FIG. 3(A).

The wideband gateway apparatus comprises a transmit frequency characteristic correction section (not shown) having a correction frequency characteristic as shown in FIG. 3(C), and has the transmit frequency characteristic correction section correct the frequency characteristic of a signal from the narrowband telephone. Thereby, the corrected signal has a flat frequency characteristic over the entire voice band (wide band) as shown in FIG. 3(B).

While FIG. 3 and FIG. 4 mentioned later are an example where the upper limit of the wideband is 8 KHz, the present embodiment is not limited to this.

Next, the case will be explained where a wideband gateway apparatus corrects an input wideband signal and gives it to a narrowband telephone.

The wideband signal that the IP network 4 side gives to the wideband gateway apparatus has a flat frequency characteristic over the entire wide band as shown in FIG. 4(B). On the other hand, the narrowband telephone as a filter for the receive signal has a frequency characteristic as shown in FIG. 4(A) to remove unnecessary components for the public switched telephone network.

Hence, the wideband gateway apparatus comprises a receive frequency characteristic correction section (not shown) having a correction frequency characteristic as shown in FIG. 4(C), and has the receive frequency characteristic correction section correct the wideband signal having the flat frequency characteristic to be a signal having a frequency characteristic whose lower and higher band sides are lifted. When this signal passes through the filter having the frequency characteristic as shown in FIG. 4(A), the signal having passed through has a flat frequency characteristic over the entire wideband as shown in FIG. 4(D).

According to the first embodiment, instead of selecting whether the entire phone-call path is of wideband or narrowband in communication, communication is set to be wideband, narrowband, or quasi-wideband communication (wideband communication using the above correction function) on a per phone-call path part basis depending on the types of apparatuses engaging in the telephone call.

That is, in order to realize telephone communication of as high quality as possible, communication is set to be wideband, narrowband, or quasi-wideband communication (wideband communication using the above correction function) on a per phone-call path part basis.

Figure 1:
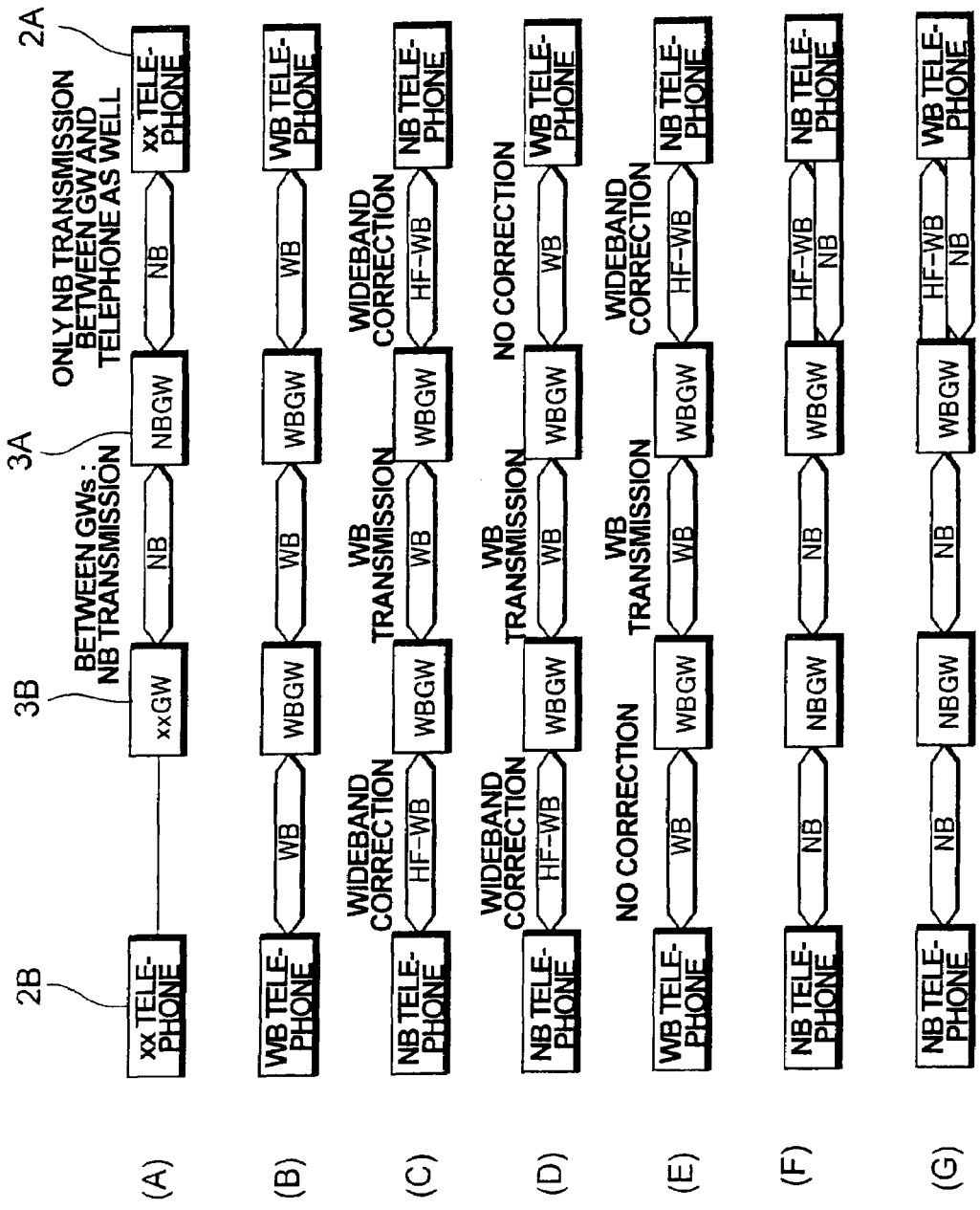
FIG. 1 is a view for explaining a method of setting phone-call path parts to be of wideband and narrowband according to an embodiment.

FIG. 1 is a view for explaining the combinations of the types of apparatuses engaging in the telephone call, and the setting content of wideband, narrowband, or quasi-wideband communication on a per phone-call path part basis.

Note that FIG. 1 shows cases where the telephone 2A is the call-originating side and the telephone 2B is the call-incoming side. In the following explanation of FIG. 1, a case where the call-incoming side is the IP telephone 2C and a case where the call-originating side is the IP telephone 2C will also be explained in a supplementary way.

In the case of FIG. 1(A), the telephone 2A on the call-originating side is an NB or WB telephone; the accommodating gateway apparatus 3A is an NBGW; and the opposite gateway apparatus 3B is also an NBGW. In this case, because the accommodating gateway apparatus 3A is an NBGW, the telephone 2A on the call-originating side and the gateway apparatus 3A perform processing considering that all phone-call path parts are a narrowband phone-call path, regardless of the phone-call path part between the gateway apparatus 3B and the telephone 2B on the call-incoming side.

Note that also in the case where the call-incoming side is not the combination of the gateway apparatus 3B and the telephone 2B but an NBIP or WBIP telephone, narrowband communication is performed likewise over all phone-call path parts.

Moreover, in the case where the call-originating side is an NBIP telephone, narrowband communication is performed likewise over all phone-call path parts.

In the case of FIG. 1(B), the telephone 2A on the call-originating side is a WB telephone; the accommodating gateway apparatus 3A is a WBGW; the opposite gateway apparatus 3B is also a WBGW; and the opposite telephone 2B is also a WB telephone. In this case, because all phone-call path parts are wideband-compliant, processing is performed considering that all phone-call path parts are a wideband phone-call path.

Note that also in the case where the call-incoming side is not the combination of the gateway apparatus 3B and the telephone 2B but a WBIP telephone, wideband communication is performed likewise over all phone-call path parts.

Moreover, in the case where the call-originating side is a WBIP telephone, wideband communication is performed likewise over all phone-call path parts.

In the case of FIG. 1(C), the telephone 2A on the call-originating side is an NB telephone; the accommodating gateway apparatus 3A is a WBGW; the opposite gateway apparatus 3B is also a WBGW; and the opposite telephone 2B is an NB telephone. In this case, because the WBGW 3A, 3B accommodate respectively the call-originating telephone 2A and the call-incoming telephone 2B, quasi-wideband communication using the correction function is performed both between the telephone 2A and the gateway apparatus 3A and between the telephone 2B and the gateway apparatus 3B. And wideband communication is performed between both the gateway apparatuses 3A and 3B.

Note that also in the case where the call-incoming side is not the combination of the gateway apparatus 3B and the telephone 2B but an NBIP telephone 2C (not shown), quasi-wideband communication using the correction function is performed between the NBIP telephone 2C and the gateway apparatus 3A.

Also in the case where the call-originating side is not the combination of the telephone 2A and the gateway apparatus 3A but an NBIP telephone 2C (not shown), quasi-wideband communication using the correction function is performed between the NBIP telephone 2C and the gateway apparatus 3B.

In the case of FIG. 1(D), the telephone 2A on the call-originating side is a WB telephone; the accommodating gateway apparatus 3A is a WBGW; the opposite gateway apparatus 3B is also a WBGW; and the opposite telephone 2B is an NB telephone. In this case, wideband communication is performed over the phone-call path part between the call-originating telephone 2A and the gateway apparatus 3B, and quasi-wideband communication using the correction function is performed between the telephone 2B and the gateway apparatus 3B on the call-incoming side.

Note that also in the case where the call-incoming side is not the combination of the gateway apparatus 3B and the telephone 2B but an NBIP telephone 2C (not shown), quasi-wideband communication using the correction function is performed between the NBIP telephone 2C and the gateway apparatus 3A.

Also in the case where the call-originating side is not the combination of the telephone 2A and the gateway apparatus 3A but a WBIP telephone 2C (not shown), wideband communication is performed between the WBIP telephone 2C and the gateway apparatus 3B.

In the case of FIG. 1(E), the telephone 2A on the call-originating side is an NB telephone; the accommodating gateway apparatus 3A is a WBGW; the opposite gateway apparatus 3B is also a WBGW; and the opposite telephone 2B is a WB telephone. In this case, wideband communication is performed over the phone-call path part between the gateway apparatus 3A on the call-originating side and the telephone 2B on the call-incoming side, and quasi-wideband communication using the correction function is performed between the telephone 2A and the gateway apparatus 3A on the call-originating side.

Note that also in the case where the call-incoming side is not the combination of the gateway apparatus 3B and the telephone 2B but a WBIP telephone 2C (not shown), wideband communication is performed between the WBIP telephone 2C and the gateway apparatus 3A.

Also in the case where the call-originating side is not the combination of the telephone 2A and the gateway apparatus 3A but an NBIP telephone 2C (not shown), quasi-wideband communication using the correction function is performed between the NBIP telephone 2C and the gateway apparatus 3B.

In the case of FIG. 1(F), the telephone 2A on the call-originating side is an NB telephone; the accommodating gateway apparatus 3A is a WBGW; the opposite gateway apparatus 3B is an NBGW; and the opposite telephone 2B is an NB telephone. In this case, there is no choice other than narrowband communication being performed over the phone-call path part between the gateway apparatus 3A on the call-originating side and the telephone 2B on the call-incoming side. Between the telephone 2A and the gateway apparatus 3A on the call-originating side, quasi-wideband communication using the correction function is performed in the direction of the telephone 2A on the call-originating side, and narrowband communication is performed in the direction of the gateway apparatus 3A. At this time, the correction by the gateway apparatus 3A is not correction for flattening the frequency characteristic, but correction for lifting bands that is to be restricted by the NB telephone 2A.

Note that also in the case where the call-incoming side is not the combination of the gateway apparatus 3B and the telephone 2B but an NBIP telephone 2C (not shown), narrowband communication is performed between the NBIP telephone 2C and the gateway apparatus 3A as above.

In the case of FIG. 1(G), the telephone 2A on the call-originating side is a WB telephone; the accommodating gateway apparatus 3A is a WBGW; the opposite gateway apparatus 3B is a NBGW; and the opposite telephone 2B is an NB telephone. In this case, there is no choice other than narrowband communication being performed over the phone-call path part between the gateway apparatus 3A on the call-originating side and the telephone 2B on the call-incoming side. Between the telephone 2A and the gateway apparatus 3A on the call-originating side, quasi-wideband communication using the correction function is performed in the direction of the telephone 2A on the call-originating side, and narrowband communication is performed in the direction of the gateway apparatus 3A. At this time, the correction by the gateway apparatus 3A is correction for flattening the frequency characteristic.

Note that also in the case where the call-originating side is not the combination of the telephone 2A and the gateway apparatus 3A and but a WBIP telephone 2C (not shown), narrowband communication is performed between the WBIP telephone 2C and the gateway apparatus 3B.

In order to establish a phone-call path, the gateway apparatuses 3A, 3B need to identify, for each new call or beforehand, whether the telephones 2A, 2B accommodated by them are individually a narrowband or wideband telephone. Also, the gateway apparatuses 3A, 3B need to notify wideband telephones accommodated by them of whether the incoming call is a wideband or narrowband incoming call. These will be explained in a description of specific transmission sequences.

As described above, when for-narrowband apparatuses and for-wideband apparatuses are mixed as apparatuses engaging in the telephone communication, transmission capability of each apparatus for each direction is controlled to achieve the highest communication quality in the mixed situation, without simply determining that narrowband communication is to be performed over the entire phone-call path.

Such control is performed by sending and receiving information about transmission capability between the apparatuses in the transmission sequence so that each apparatus autonomously sets itself to one of the states in FIG. 1.

Several examples of the transmission sequence in the case of following an H.323 control protocol will be explained below.

Here, although capability negotiation in the H.323 control protocol is based on capability negotiation in a terminal capability setting procedure under an H.245 control (after an end-to-end call is established), the following transmission sequence adopts a different method. That is, using as a premise that the timing of terminal capability selection is sent in an ALERT message according to an H.323 fast start sequence, a voice logical path between gateway apparatuses is set up on receiving the ALERT message. Furthermore, a RBT (Ring Back Tone) is sent from the gateway apparatus on the call-originating side.

Note that in sequence diagrams described below, sending and receiving ARQ/ACF is omitted. Also "H.323GK" in those sequence diagrams represents a gatekeeper following the H.323 control protocol in the IP network 4.

Figure 5:
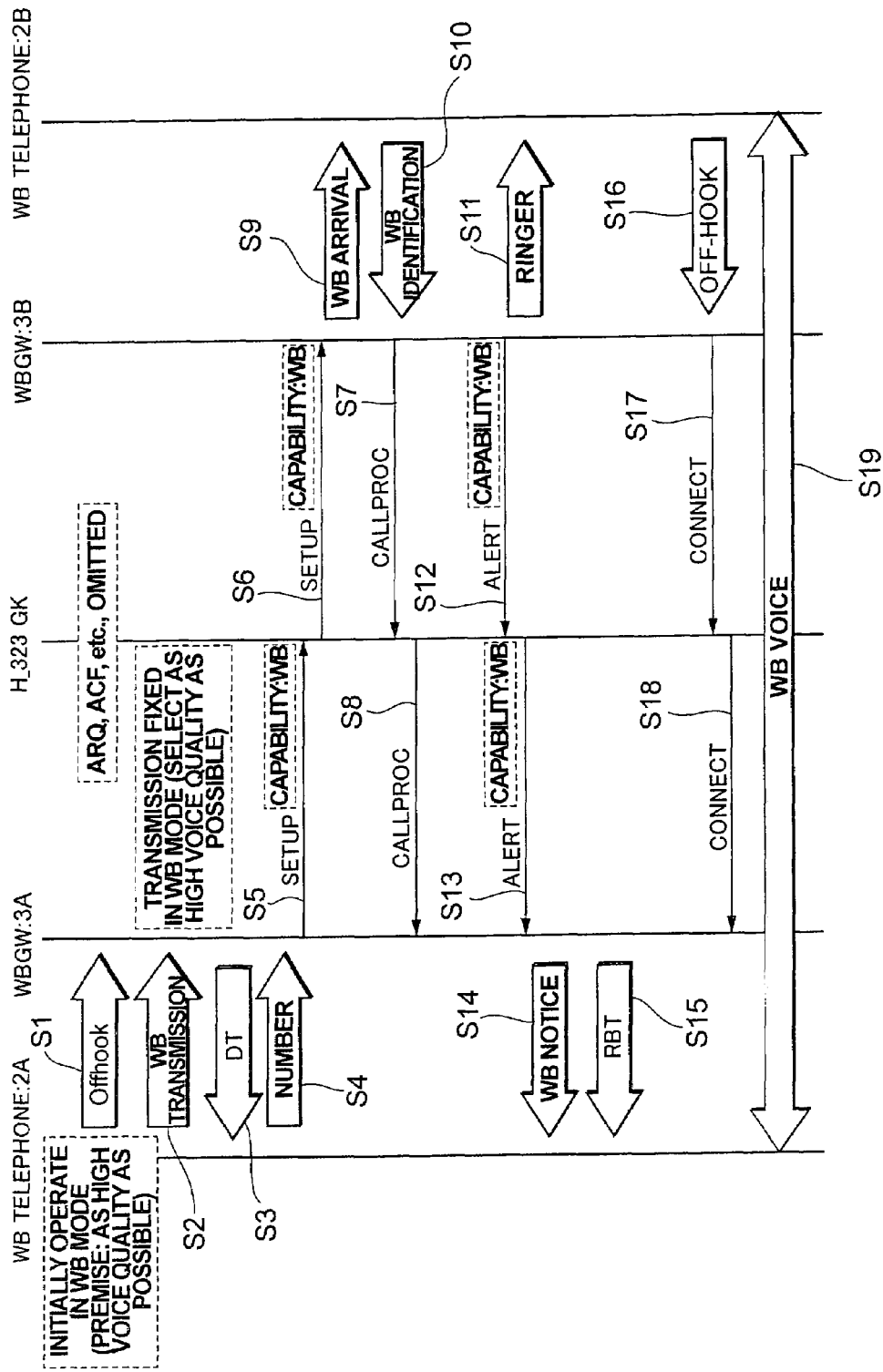
FIG. 5 is a sequence diagram of transmission according to an H.323 control protocol from a WB telephone under the control of a WBGW to a WB telephone under the control of a WBGW according to the embodiment.

FIG. 5 is a sequence diagram of transmission from a WB telephone 2A under the control of a WBGW 3A to a WB telephone 2B under the control of a WBGW 3B. The sequence diagram of FIG. 5 corresponds to the case of FIG. 1(B).

When the WB telephone 2A on call-originating side is off hooked, the WBGW 3A is notified of that (S1). Also the WBGW 3A identifies that it is a transmission requesting wideband communication (hereinafter called WB transmission) (S2).

The WB telephone 2A on call-originating side is capable of operation in an NB mode (narrowband mode) as well, but initially transmits in a WB mode (wideband mode) in order to make the voice quality as high as possible. Only when a call cannot be set up by a transmission in the wideband mode, a shift is made to a transmission in the NB mode. Also, for the same reason, the default mode of the WBGW 3A is set to be the WB mode (wideband mode).

The methods of the WBGW 3A identifying that the telephone 2A on call-originating side is a WB telephone are the following: (a) after off-hook, the telephone 2A notifies the WBGW 3A that it is a WB telephone by a tone signal of frequencies in the wideband (including 4 KHz and the higher), a PB signal, a DP signal, or a modem signal; (b) to have information held in the WBGW 3A by using a selection switch or software setting in a fixed manner; and (c) to provide the WBGW 3A with a wideband-dedicated port and a narrowband-dedicated port to identify which port is connected.

Responding to a reply in dial tone (DT) from the WBGW 3A (S3), the WB telephone 2A sends out a destination number (S4), and then the WBGW 3A sends out a SETUP message containing information representing that transmission capability is of WB (wideband) to the IP network 4 side (S5). This SETUP message is transferred via the gatekeeper to the WBGW 3B on the call-incoming side (S6).

The WBGW 3B sends out a CALLPROC message to the WBGW 3A on call-originating side to notify the receipt of the SETUP message (S7, S8).

Moreover, the WBGW 3B notifies the WB arrival to the WB telephone 2B under the control thereof (S9), and identifies that the WB telephone 2B under the control thereof can respond to wideband communication (S10).

The methods of the WBGW 3B notifying the WB arrival (or NB arrival) to the WB telephone 2B under the control thereof are the following: (a) to use a sequence equivalent to a number display service (the notifying signal being modem, PB or tone (including 4 KHz and the higher)), or use a dedicated ringer (distinctive in interval, voltage and/or waveform); and (b) to notify by a tone in an on-hook state (equivalent to no-ring arrival or no-ringing service).

The methods of the WBGW 3B identifying that the call-incoming telephone 2B is capable of wideband response are the following: (a) the telephone 2B notifies the WBGW 3B of being a WB telephone by a tone signal of frequencies in the wideband (including 4 KHz and the higher), a PB signal, a DP signal, or a modem signal; (b) to have information held in the WBGW 3B by using a selection switch or software setting in a fixed manner; and (c) to provide the WBGW 3B with a wideband-dedicated port and a narrowband-dedicated port to identify which port is connected.

When having identified that the call-incoming telephone 2B is capable of WB response, the WBGW 3B rings the call-incoming telephone 2B (S11), and at the same time, sends the WBGW 3A an ALERT message containing information indicating that the transmission capability of the call-incoming telephone 2B is of WB (S12, S13).

By this means, a voice path is set up between the WBGWs 3A and 3B (not shown in FIG. 5 and the other sequence diagrams, with a description thereof also omitted). Furthermore, the WBGW 3A notifies the WB telephone 2A under the control thereof (S14) of being capable of wideband communication, and rings the WB telephone 2A by giving a RBT (S15).

The methods of the WBGW 3A notifying the WB telephone 2A under its control that the call-incoming side is also capable of wideband communication are the following: (a) the WBGW 3A sends out a tone signal (including 4 KHz and the higher), a PB signal or a modem signal to the telephone 2A; (b) the WBGW 3A sends out a RBT exclusively used for identifying WB; (C) the WB telephone 2A sends out a guidance voice to have the speaker operate the buttons or to recognize the speaker's voice and thus identifies; and (d) to have information held in the WBGW 3A by using a selection switch or software setting in a fixed manner.

When the call-incoming WB telephone 2B is off hooked (S16), the WBGW 3B sends a CONNECT message to the WBGW 3A on the call-originating side (S17, S18). By this means, a shift is made to a wideband phone-call state (S19).

For example, between the WBGWs 3A and 3B, a wideband phone-call path is set up by setting up a voice path; between the call-originating telephone 2A and the WBGW 3A, a wideband phone-call path is set up by receiving the ALERT message; between the call-incoming telephone 2B and the WBGW 3B, a wideband phone-call path is set up by identifying the call-incoming telephone 2B.

Figure 6:
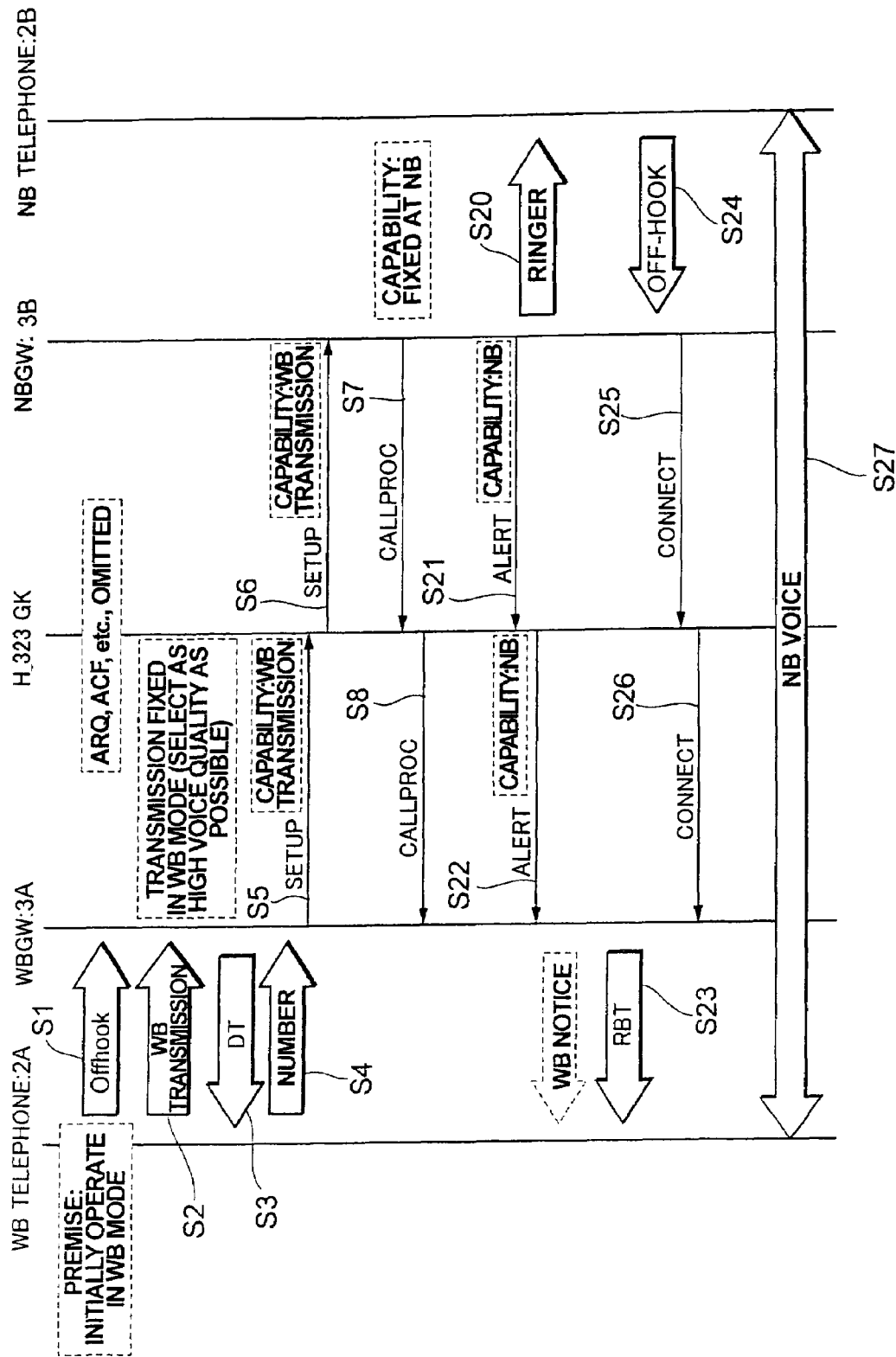
FIG. 6 is a sequence diagram of transmission according to the H.323 control protocol from a WB telephone under the control of a WBGW to an NB telephone under the control of an NBGW according to the embodiment.

FIG. 6 is a sequence diagram of transmission from a WB telephone 2A under the control of a WBGW 3A to an NB telephone 2B under the control of an NBGW 3B. The sequence diagram of FIG. 6 corresponds to the case of FIG. 1(G).

Because the processing up to step S8 is the same as in the sequence diagram of FIG. 5, only the sequence later than that will be explained.

Because the call-incoming side is formed by the NBGW 3B and the NB telephone 2B, transmission capability is fixed at the narrowband (NB). Hence, without notifying the call-incoming telephone 2B of the WB arrival and identifying whether to be capable of wideband response, the NBGW 3B rings the call-incoming telephone 2B (S20), and at the same time, sends the WBGW 3A an ALERT message containing information indicating that the transmission capability of the call-incoming telephone 2B is of NB (S21, S22).

By this means, the WBGW 3A immediately gives a RBT to the WB telephone 2A to ring (S23). The WB telephone 2A recognizes that it is to be narrowband communication because the RBT has arrived without a notice of being capable of wideband communication.

When the call-incoming telephone 2B is off hooked (S24), the WBGW 3B sends a CONNECT message to the WBGW 3A on the call-originating side (S25, S26). By this means, a shift is made to a narrowband phone-call state (S27), but the WBGW 3A selects quasi-wideband communication using its own correction function as communication to the call-originating telephone 2A.

Figure 7:
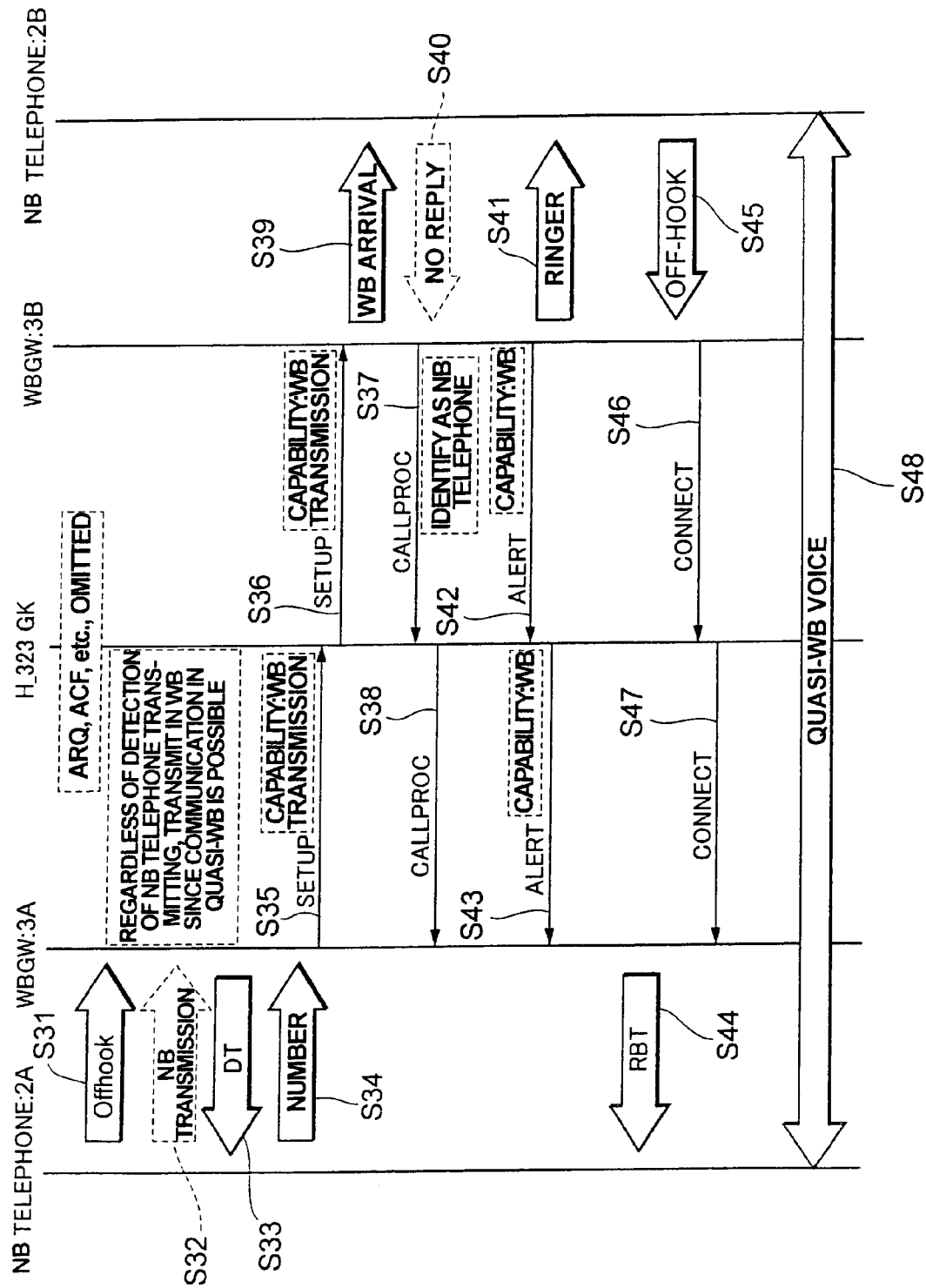
FIG. 7 is a sequence diagram of transmission according to the H.323 control protocol from an NB telephone under the control of a WBGW to an NB telephone under the control of a WBGW according to the embodiment.

FIG. 7 is a sequence diagram of transmission from an NB telephone 2A under the control of a WBGW 3A to an NB telephone 2B under the control of a WBGW 3B. The sequence diagram of FIG. 7 corresponds to the case of FIG. 1(C).

When the NB telephone 2A on call-originating side is off hooked, the WBGW 3A is notified of that (S31). Also the WBGW 3A identifies that it is a transmission requesting narrowband communication (S32). This identifying method is the same as in the case of the transmission requesting wideband communication.

Responding to a reply in dial tone (DT) from the WBGW 3A (S33), the NB telephone 2A sends out a destination number (S34), and then the WBGW 3A sends out a SETUP message containing information representing that transmission capability is of WB (wideband) to the IP network 4 side (S35). This SETUP message is transferred via the gatekeeper to the WBGW 3B on the call-incoming side (S36).

The reason why the WBGW 3A sends out a SETUP message containing information representing that transmission capability is of WB (wideband) to the IP network 4 side regardless of the telephone 2A under the control thereof being an NB telephone is that quasi-wideband communication using the correction function is possible between the NB telephone 2A and the WBGW 3A.

The WBGW 3B sends out a CALLPROC message to the WBGW 3A on call-originating side to notify the receipt of the SETUP message (S37, S38).

Moreover, the WBGW 3B notifies the WB arrival to the NB telephone 2B under the control thereof (S39), and tries to identify whether the NB telephone 2B under the control thereof can respond to wideband communication and recognizes that it is an NB telephone because of no response (S40).

When having identified that the call-incoming telephone 2B is not capable of WB response, the WBGW 3B rings the call-incoming telephone 2B (S41), and at the same time, sends the WBGW 3A an ALERT message containing information indicating that the transmission capability of the call-incoming telephone 2B is of WB (S42, S43). Here also, because quasi-wideband communication using the correction function is possible between the NB telephone 2B and the WBGW 3B, the WBGW 3B sends out the ALERT message containing information representing that transmission capability is of WB (wideband) to the IP network 4 side.

Since having already identified that the telephone 2A under the control thereof is an NB telephone, the WBGW 3A gives a RBT to the NB telephone 2A to ring immediately after receiving the ALERT message (S44).

When the call-incoming NB telephone 2B is off hooked (S45), the WBGW 3B sends a CONNECT message to the WBGW 3A on the call-originating side (S46, S47). By this means, a shift is made to a quasi-wideband phone-call state (S48).

For example, between the WBGWs 3A and 3B, a wideband phone-call path is set up by setting up a voice path; between the call-originating telephone 2A and the WBGW 3A, a quasi-wideband phone-call path is set up by receiving the ALERT message; between the call-incoming telephone 2B and the WBGW 3B, a quasi-wideband phone-call path is set up by identifying the capability of the call-incoming telephone 2B. As a result, the entire phone-call path is a quasi-wideband phone-call path.

Note that when ringing the ringer in the above step S41, the call-incoming side may be notified of the type of the telephone 2A or the gateway apparatus 3A on the call-originating side by ringing a ringer distinctive for the WB (no ringing when NB), or instead, may be notified of the type of the telephone 2A or the gateway apparatus 3A on the call-originating side by turning on a predetermined LED of the telephone 2B or the gateway apparatus 3B or by giving dedicated guidance or tone to the telephone 2B.

Moreover, when the band of the final phone-call mode (quasi-wideband in FIG. 7) is not the original band of the call-originating telephone 2A, the sender may be notified of that. It is preferable that the sender is notified before a phone-call path is set up so that the responder does not hear. The notifying method is to use a tone signal or a RBT signal, to use voice guidance, or to turn on a LED.

Figure 8:
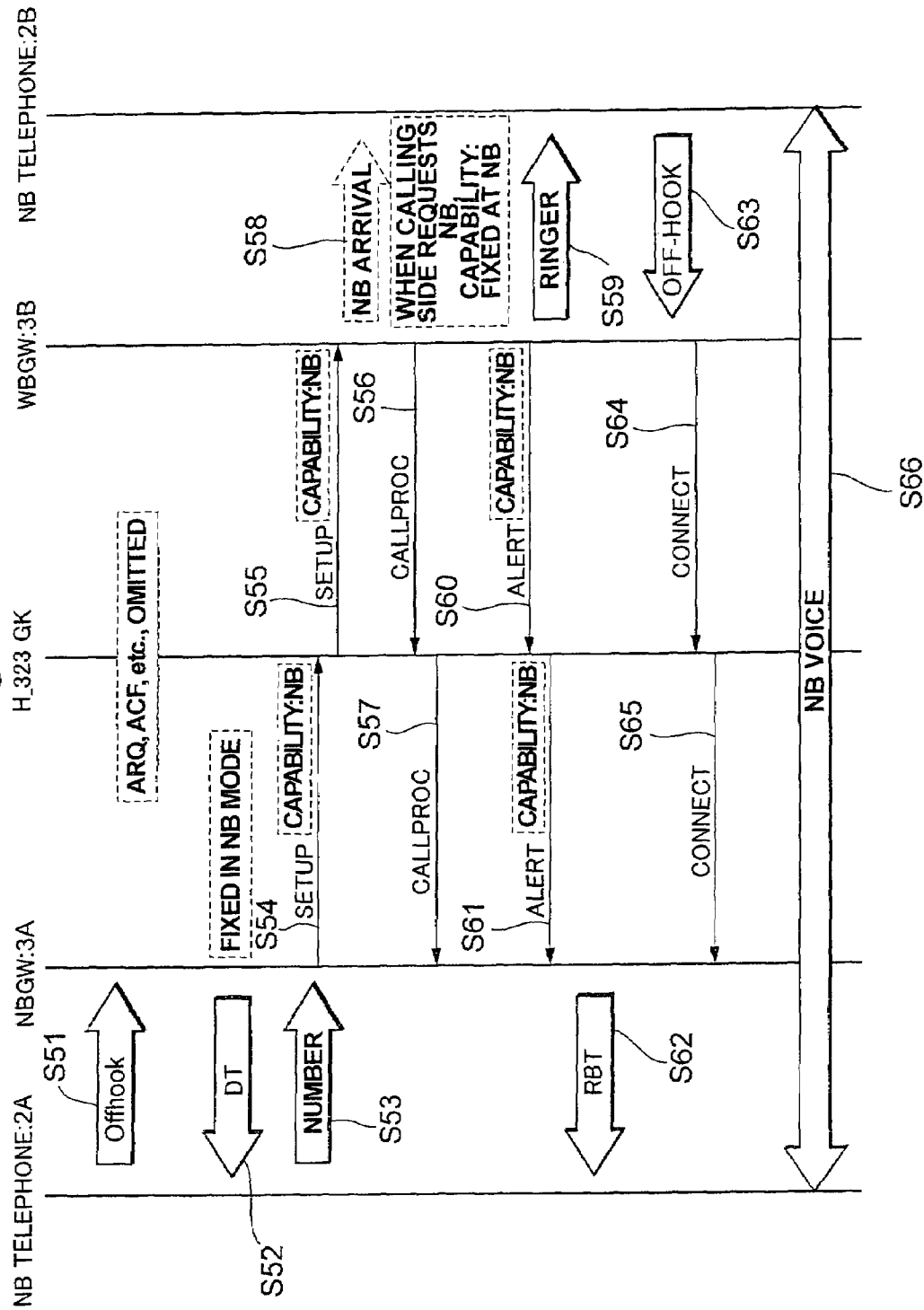
FIG. 8 is a sequence diagram of transmission according to the H.323 control protocol from an NB telephone under the control of an NBGW to an NB telephone under the control of a WBGW according to the embodiment.

FIG. 8 is a sequence diagram of transmission from an NB telephone 2A under the control of an NBGW 3A to an NB telephone 2B under the control of a WBGW 3B. The sequence diagram of FIG. 8 corresponds to the case of FIG. 1(A).

When the NB telephone 2A on call-originating side is off hooked, the NBGW 3A is notified of that (S51). Because the call-originating side is formed by the NB telephone 2A and the NBGW 3A, the NBGW 3A is fixed to be in the narrowband communication mode, and hence, the processing for recognizing the telephone 2A is not performed.

Responding to a reply in dial tone (DT) from the NBGW 3A (S52), the NB telephone 2A sends out a destination number (S53), and then the NBGW 3A sends out a SETUP message containing information representing that transmission capability is of NB (narrowband) to the IP network 4 side (S54). This SETUP message is transferred via the gatekeeper to the WBGW 3B on the call-incoming side (S55).

The WBGW 3B sends out a CALLPROC message to the WBGW 3A on call-originating side to notify the receipt of the SETUP message (S56, S57).

Moreover, the WBGW 3B notifies the NB arrival to the NB telephone 2B under the control thereof (S58). When notifying the NB arrival, the WBGW 3B rings the call-incoming NB telephone 2B without waiting for a response (S59), and at the same time, the WBGW 3B sends out an ALERT message containing information representing that the transmission capability of the NB telephone 2B is of NB to the NBGW 3A on the call-originating side (S60, S61).

Because the NB telephone 2A has been identified as an NB telephone, immediately after receiving the ALERT message, the NBGW 3A gives a RBT to the NB telephone 2A to ring (S62).

When the call-incoming NB telephone 2B is off hooked (S63), the WBGW 3B sends a CONNECT message to the WBGW 3A on the call-originating side (S64, S65). By this means, a shift is made to a narrowband phone-call state (S66).

For example, between the NBGW 3A and WBGW 3B, a narrowband phone-call path is set up by setting up a voice path; between the call-originating NB telephone 2A and the NBGW 3A, a narrowband phone-call path is set up by receiving the ALERT message; between the call-incoming NB telephone 2B and the WBGW 3B, a narrowband phone-call path is set up by identifying the capability of the call-incoming telephone 2B. As a result, the entire phone-call path is a narrowband phone-call path.

Figure 9:
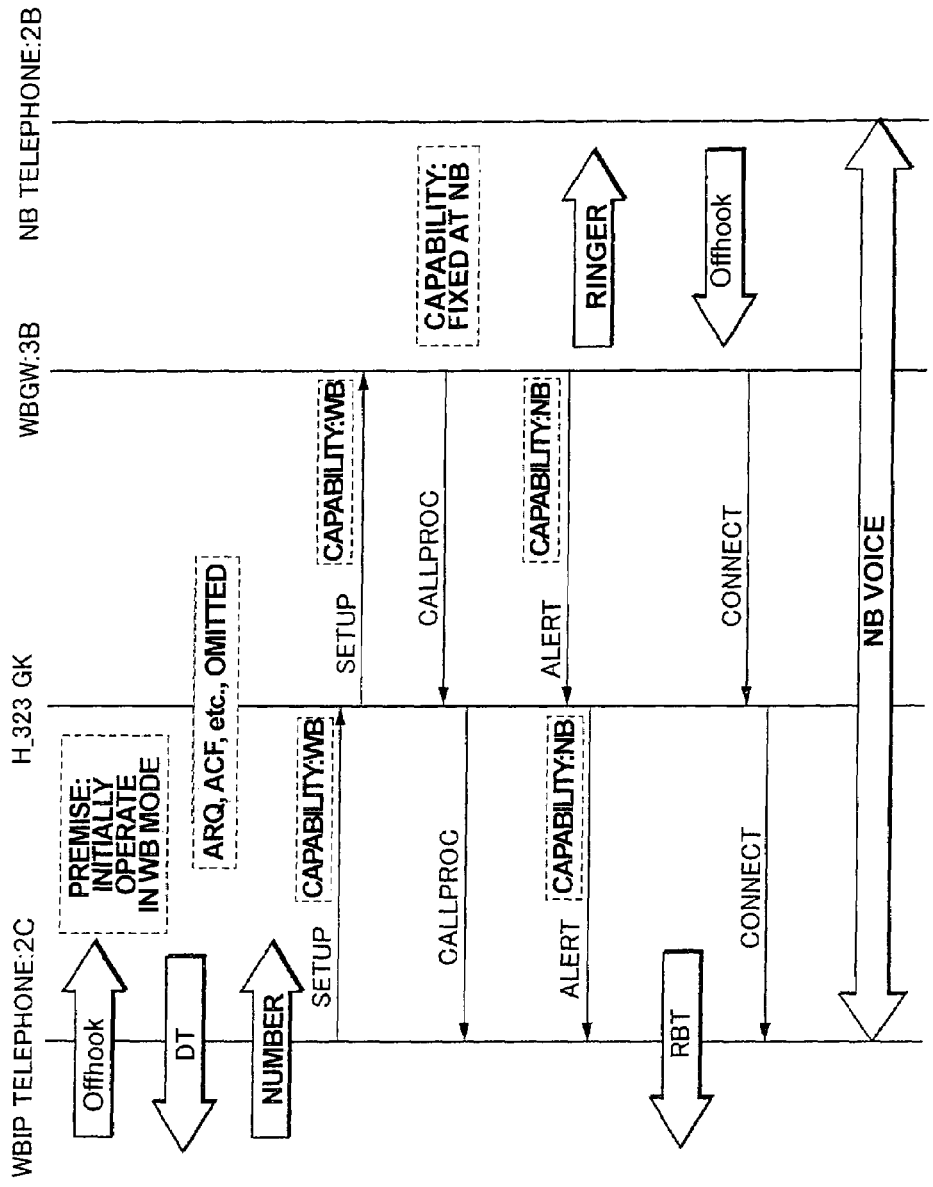
FIG. 9 is a sequence diagram of transmission according to the H.323 control protocol from a WBIP telephone to an NB telephone under the control of an NBGW according to the embodiment.

FIG. 9 is a figure given by replacing the telephone 2A and the gateway apparatus 3A on the call-originating side in FIG. 6 with a WBIP telephone 2C. Although a detailed description thereof is omitted, processing is performed in a similar sequence to that in the case of the call-originating side formed by the telephone 2A and the gateway apparatus 3A.

Also in other cases where a WBIP telephone or an NBIP telephone is used instead of either of the combinations of a telephone and a gateway apparatus, processing is performed in a similar sequence.

Figure 10:
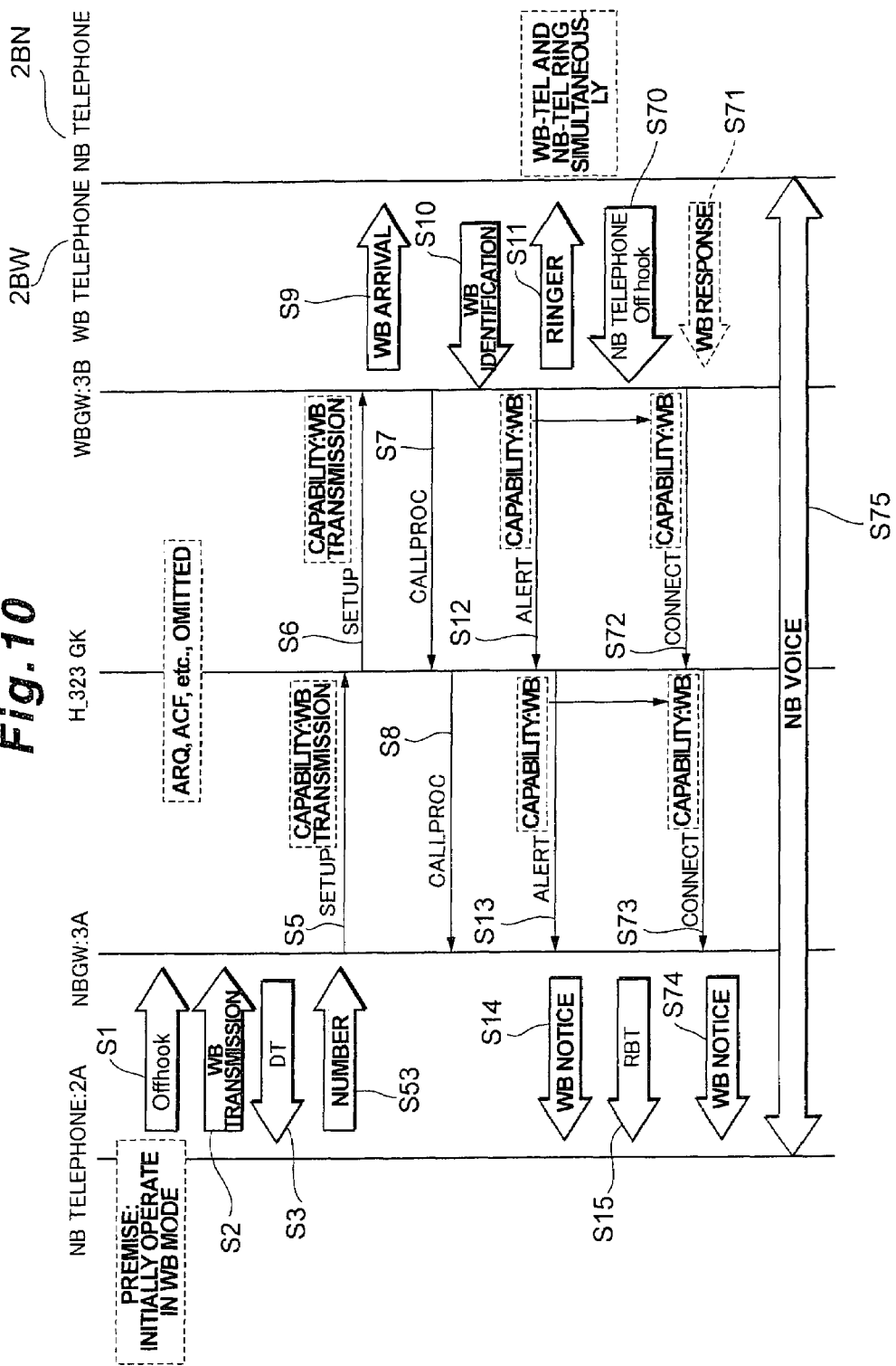
FIG. 10 is a sequence diagram of transmission according to the H.323 control protocol from a WB telephone under the control of a WBGW to WB and NB telephones under the control of a WBGW according to the embodiment.

FIG. 10 is a sequence diagram for the case where a WB telephone 2BW and an NB telephone 2BN are connected to a gateway apparatus 3B on the call-incoming side. That is, FIG. 10 is a sequence diagram of transmission from a WB telephone 2A under the control of a WBGW 3A to the WB telephone 2BW and the NB telephone 2BN under the control of the WBGW 3B.

In practice, one gateway apparatus can accommodate a plurality of telephones, and the same gateway apparatus may accommodate telephones different in transmission capability.

The processing up to step S15 is the same as in the sequence diagram of FIG. 5. Note that only the WB telephone 2BW having transmission capability of WB responds to a notice of the WB arrival in step S9 and that, in step S11, a ringer is supplied to both the WB telephone 2BW and the NB telephone 2BN to ring together.

In response to this, if the NB telephone 2BN, from which the WBGW 3B has not received a response to the arrival notice, is off hooked (S70), the WBGW 3B confirms the capability of the telephone having responded under the control thereof (S71).

As the method of recognizing that the type of telephone has changed after a notice of WB call as in step S71, a method can be used which configures a WB telephone to return a WB response signal also after off hooked and which determines it to be a WB telephone if the response is returned, or an NB telephone if no response. Also in this case, as the identifying method, the method explained for step S10 can be used.

When the NB telephone 2BN is off hooked, the WBGW 3B sends the WBGW 3A on the call-originating side a CONNECT message containing transmission capability information (S72, S73). The WBGW 3A on the call-originating side notifies capability change to the WB telephone 2A (S74), and thereby, the entire phone-call path shifts to the quasi-wideband phone-call state (S75). That is, the phone-call path changes from the wideband phone-call state to the quasi-wideband phone-call state.

While, in FIG. 10, the transmission capability information contained in the CONNECT message indicates WB, the transmission capability information may be set to indicate quasi-wideband.

While FIG. 10 shows the case where because the NB telephone 2BN is off hooked when the WB call has been confirmed, the WBGW 3B autonomously changes the path with the NB telephone 2BN to quasi-wideband, another method may be used. For example, it may be that while either of the gateway apparatuses 3A, 3B monitors the telephone signal, if it does not have a band of 4 KHz or higher, either of the gateway apparatuses 3A, 3B or the WB telephone (or instead, a WBIP telephone) on the call-originating side performs the quasi-wideband correction.

Also for notifying capability change in step S74, a similar notifying method to that used initially in step S14 can be used.

While examples of the sequence according to the H.323 control protocol have been explained in the above, the phone-call paths shown in FIG. 1 can be established using a SIP control protocol or a MGCP control protocol.

Figure 11:
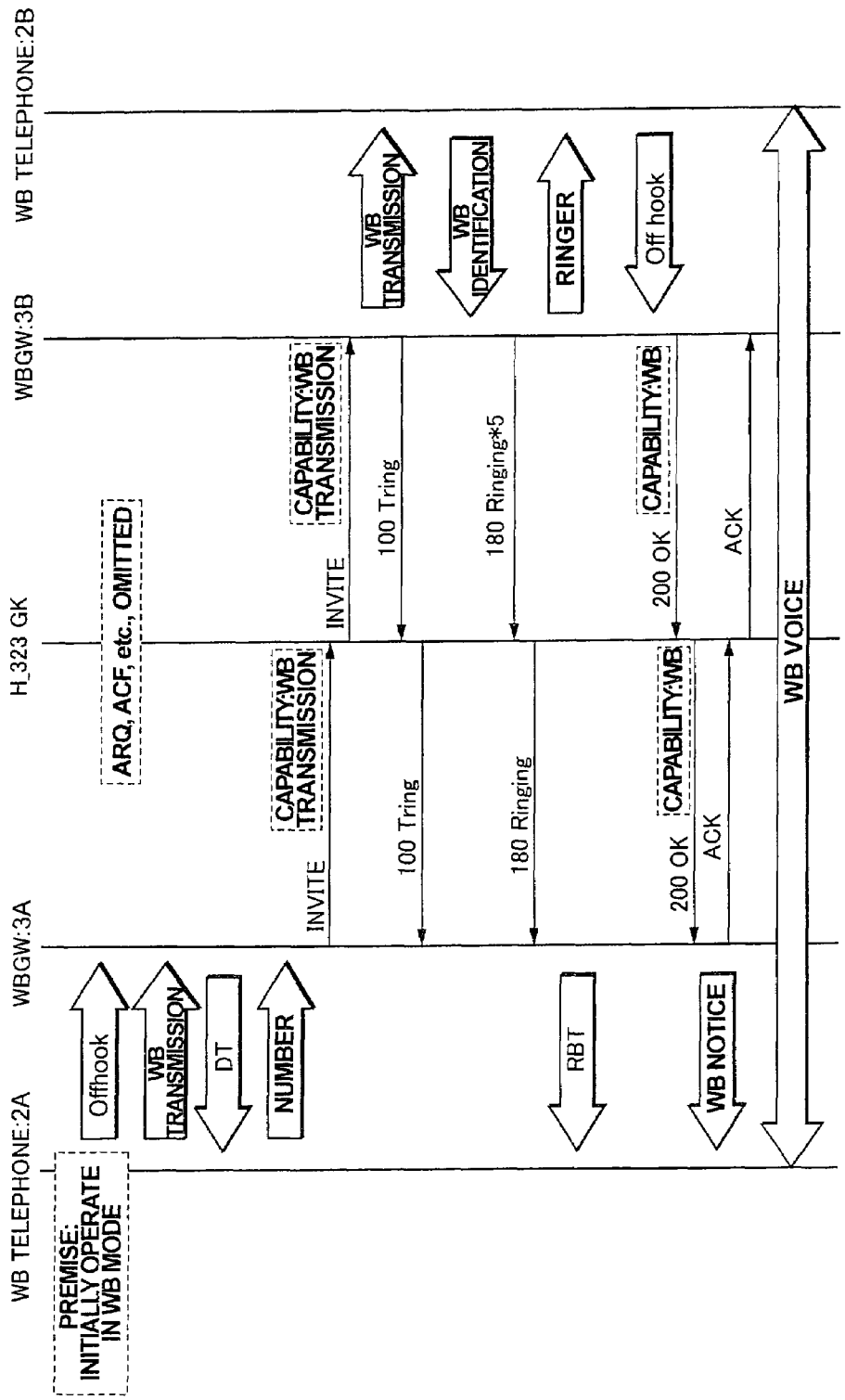
FIG. 11 is a sequence diagram of transmission according to a SIP control protocol from a WB telephone under the control of a WBGW to a WB telephone under the control of a WBGW according to the embodiment.

FIG. 11 shows an example of the sequence according to the SIP control protocol, which corresponds to FIG. 5 according to the H.323 control protocol. Briefly describing, in the SIP control protocol, the gateway apparatus 3A on the call-originating side notifies capability through an INVITE request, and the gateway apparatus 3B on the call-incoming side notifies the capability through a 200 OK response which is transferred after the call-incoming telephone 2B is off hooked. At this time, the gateway apparatus 3B sends a request to the other party through a description of voice capability (for example, in the "m" row of SDP).

As another means, necessary information can be sent and received through a Reuire header and a Supported header in a SIP extension. Alternatively, an OPTIONS request can be used, but is basically for confirming contents supported by the server. Yet alternatively, after obtaining information about capability of each other, a new session can be established through an INVITE (Re-INVITE) request (after establishing the new session, the original session is released).

Figure 12:
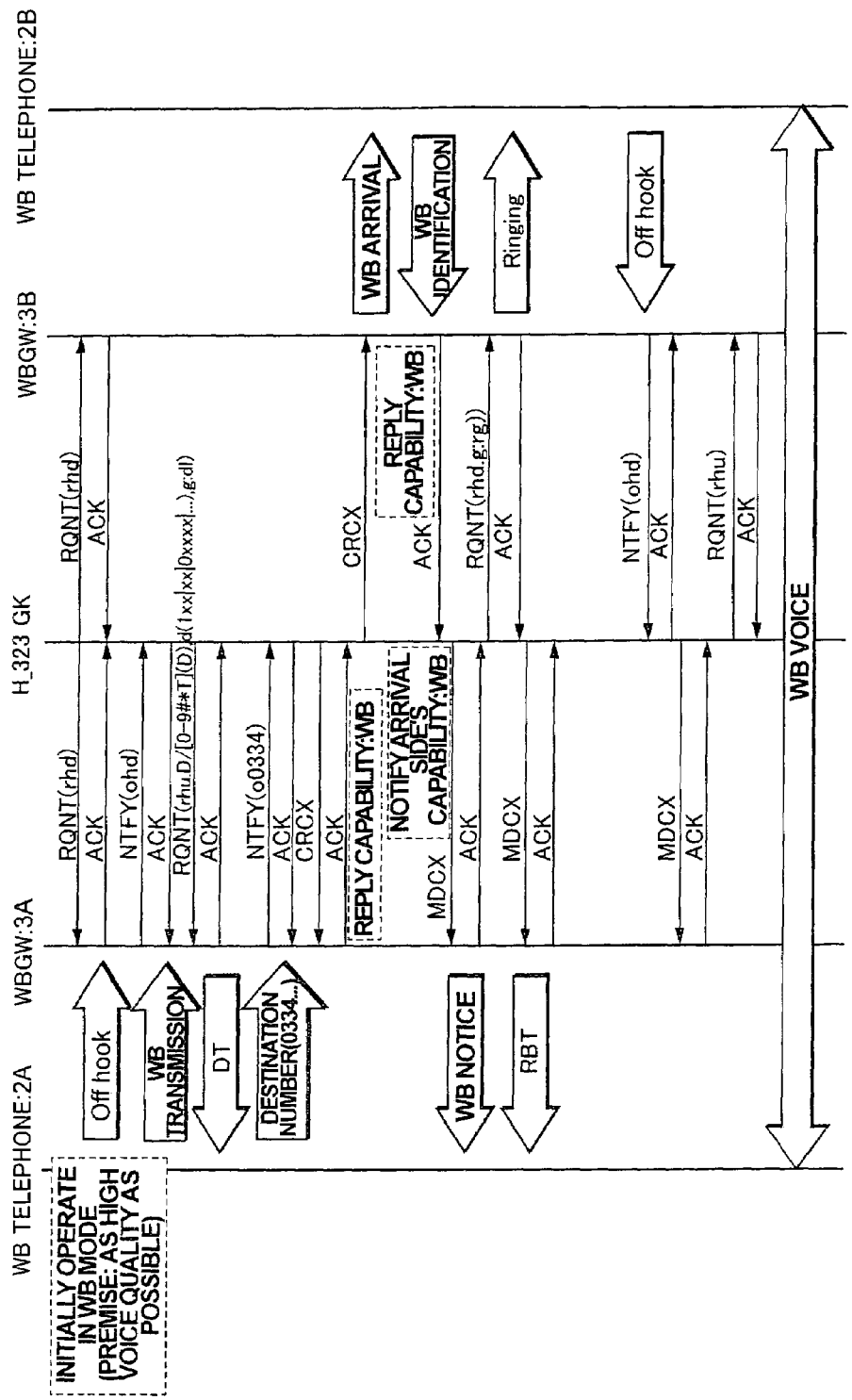
FIG. 12 is a sequence diagram of transmission according to an MGCP control protocol from a WB telephone under the control of a WBGW to a WB telephone under the control of a WBGW according to the embodiment.

FIG. 12 shows an example of the sequence according to the MGCP control protocol, which corresponds to FIG. 5 according to the H.323 control protocol. Briefly describing, in the MGCP control protocol, a call agent CA in the IP network 4 reads out information about capability from the gateway apparatus 3A on the call-originating side through a CRCX command (request for session information), and notifies it to the gateway apparatus 3B on the call-incoming side through a CRCX message. The gateway apparatus 3B on the call-incoming side notifies the capability through an ACK message that is a call-incoming response.

That is, the call agent can be informed of voice capability information through a capability description according to the SDP like in the SIP. The call-originating side returns the information (written in SDP) via an ACK command in response to a CRCX command from the call agent. After that, the call-incoming side returns the information (written in SDP) via an ACK command likewise in response to a CRCX command (a request for connection generation) from the call agent. Finally, the call-originating side receives the session information of the call-incoming side through a MDCX command from the call agent, and changes information about connection already established. Note that the capability information can be changed also using a MDCX command issued by the off hook of the call-incoming side.

According to the above embodiment, when apparatuses having different transmission capabilities are mixed, instead of setting the entire phone-call path to wideband or narrowband communication, communication can be differently set on a per phone-call path part basis. Thus, as a whole, almost highest communication quality can be achieved with the combination of the apparatuses engaging in communication.

(B) Other Embodiments

When the phone-call path part between the gateway apparatuses 3A, 3B is set to be of narrowband, the public switched telephone network may be used instead of the IP network.

Moreover, the path part between a gateway apparatus and a telephone under its control is not limited to priority connection, but a radio line may exist as part.

While, in the above, a wideband telephone and a wideband IP telephone can respond to both wideband and narrowband communication, a wideband telephone or a wideband IP telephone that can respond only to wideband communication may be a terminal on the call-originating or call-incoming side.

The telephone communication system of the present invention, even when apparatuses intended for wideband communication and apparatuses intended for narrowband communication exist mixedly in a communication path, can bring out as much of the capability of each apparatus as possible, thus improving communication quality.

Although the preferred embodiments of the present invention have been described in detail, it should be understood that various changes, substitutions and alterations can be made therein without departing from the spirit and scope of the invention as defined by the appended claims.

What is claimed is:

1. A telephone communication system comprises a first apparatus or apparatuses on a call-originating side and a second apparatus or apparatuses on a call-incoming side that communicate by telephone via a communication network capable of wideband communication and narrowband communication, wherein the first apparatus includes a first telephone and a first gateway connected with the first telephone and the second apparatus includes a second telephone and a second gateway connected with the second telephone, the first gateway and the second gateway being connected via the communication network, at least one of the first apparatus (call-originating side) and the second apparatus (call-incoming side) includes:

one of a first type of wideband telephone capable of wideband communication and narrowband communication, a second type of wideband telephone exclusively used for wideband communication or a narrowband telephone exclusively used for narrowband communication serving as the first telephone or the second telephone; and one of a network connection apparatus capable of wideband communication and narrowband communication or a network connection apparatus exclusively used for narrowband communication, as the first gateway or the second gateway, at least one of the first or second gateway having a wideband communication function as a wideband gateway and receiving an input signal from the first telephone or the second gateway that serves as an input object and transmits an output signal to the second gateway or the first telephone that serves as an output object;

wherein one of the first or second gateway has a correcting section which judges whether the input signal from the input object is wideband or narrowband and judges whether the transmission capability or communication function of the output object is wideband or narrowband, if the input signal and output object are different, the correcting section corrects the input signal into an opposite signal as the output signal so that the output signal corresponds to the communication function of the output object, the transmission capability or communication function being set according to a control protocol, such as H.323, SIP, MGCP or a similar protocol; and wherein, when a first or second apparatus exclusively used for narrowband communication, and one of a first or second apparatus capable of wideband communication and narrowband communication or a first or second apparatus exclusively used for wideband communication exist mixedly in between one end and another end of a communication path, at least one of phone-call path parts between adjacent ones of the first and second apparatuses is set to be different in transmission capability on a per phone-call path part basis, and the transmission capability of each apparatus is controlled to achieve the highest communication quality in the mixed situation by sending and receiving information about transmission capabilities of the first and second apparatuses in between the one end and the another end.

2. The telephone communication system according to claim 1, wherein, in a case where the second apparatus (call-incoming side) is formed by a network connection apparatus capable of wideband communication and narrowband communication serving as the second gateway; a narrowband telephone and a wideband telephone of the first or the second type, that are accommodated in parallel by the network connection apparatus, when the narrowband telephone on the call-incoming side is off hooked after the capability of the wideband telephone of the first or the second type is notified to the call-originating side through an initial capability notice, the capability notice to the call-originating side is corrected, and, taking into account that a call-incoming telephone is the narrowband telephone, the transmission capabilities of phone-call path parts between adjacent ones of the apparatuses are set on a per phone-call path part basis.

3. The telephone communication system according to claim 1, wherein the transmission capability of each phone-call path part is set to one of wideband communication, narrowband communication, and quasi-wideband communication implemented by a given apparatus performing an operation on a frequency characteristic of a phone-call signal.

4. The telephone communication system according to claim 3, wherein, in a case where the second apparatus (call-incoming side) is formed by a network connection apparatus capable of wideband communication and narrowband communication serving as the first gateway; a narrowband telephone and a wideband telephone of the first or the second type, that are accommodated in parallel by the network connection apparatus, when the narrowband telephone on the call-incoming side is off hooked after the capability of the wideband telephone of the first or the second type is notified to the call-originating side through an initial capability notice, the capability notice to the call-originating side is corrected, and, taking into account that a call-incoming telephone is the narrowband telephone, the transmission capabilities of phone-call path parts between adjacent ones of the apparatuses are set on a per phone-call path part basis.

* * * * *